(12) United States Patent  
Luo et al.

(10) Patent No.: US 12,494,028 B2
(45) Date of Patent: Dec. 9, 2025

(54) POSITIONING MODEL OPTIMIZATION METHOD, POSITIONING METHOD, POSITIONING DEVICE, AND STORAGE MEDIUM

(71) Applicant: BYTEDANCE INC., Los Angeles, CA (US)

(72) Inventors: Linjie Luo, Los Angeles, CA (US); Jing Liu, Los Angeles, CA (US); Zhili Chen, Los Angeles, CA (US); Guohui Wang, Los Angeles, CA (US); Xiao Yang, Los Angeles, CA (US); Jianchao Yang, Los Angeles, CA (US); Xiaochen Lian, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 306 days.

(21) Appl. No.: 18/000,375

(22) PCT Filed: Jul. 22, 2021

(86) PCT No.: PCT/CN2021/107975  
§ 371 (c)(1),  
(2) Date: Nov. 30, 2022

(87) PCT Pub. No.: WO2022/028253  
PCT Pub. Date: Feb. 10, 2022

(65) Prior Publication Data  
US 2023/0222749 A1    Jul. 13, 2023

(30) Foreign Application Priority Data  
Aug. 3, 2020    (CN) .......................... 202010767042.3

(51) Int. Cl.  
     *G06T 19/20*      (2011.01)

(52) U.S. Cl.  
     CPC ...... *G06T 19/20* (2013.01); *G06T 2219/2004* (2013.01)

(58) Field of Classification Search  
None  
See application file for complete search history.

(56) References Cited

U.S. PATENT DOCUMENTS 6,377,865 B1 * 4/2002 Edelsbrunner ....... G06V 30/144  
                                                    703/2  
6,396,492 B1 * 5/2002 Frisken .................. G06T 17/00  
                                                    345/420

(Continued)

FOREIGN PATENT DOCUMENTS

| CN | 103745498 A | 4/2014 |
| CN | 103942824 A | 7/2014 |

(Continued)

OTHER PUBLICATIONS

Office Action issued May 31, 2023 in CN Appl. No. 202010767042.3, English Translation (28 pages).

(Continued)

*Primary Examiner* — Jason A Pringle-Parker

(57) ABSTRACT

A positioning model optimization method, an image-based positioning method and positioning device, and a computer-readable storage medium are provided. The positioning model optimization method includes: inputting a positioning model for a scene, the positioning model including a three-dimensional (3D) point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized (Continued)

positioning model for the scene; and outputting the optimized positioning model for the scene.

14 Claims, 3 Drawing Sheets

(56) References Cited

U.S. PATENT DOCUMENTS

| | | | | |
|---|---|---|---|---|
| 8,756,085 | B1* | 6/2014 | Plummer | G06Q 40/00 |
| | | | | 705/40 |
| 9,858,640 | B1* | 1/2018 | Earl | G06T 11/60 |
| 10,346,998 | B1* | 7/2019 | Anderberg | G06T 7/11 |
| 2008/0043035 | A1* | 2/2008 | Chang | G06T 17/00 |
| | | | | 345/619 |
| 2014/0010407 | A1* | 1/2014 | Sinha | G06T 7/73 |
| | | | | 382/103 |
| 2015/0220812 | A1* | 8/2015 | Curington | G06F 18/231 |
| | | | | 382/154 |
| 2016/0071327 | A1* | 3/2016 | Wu | G06T 17/205 |
| | | | | 382/154 |
| 2016/0117858 | A1* | 4/2016 | Wu | G06T 17/00 |
| | | | | 345/420 |
| 2016/0163102 | A1* | 6/2016 | Chang | G06T 17/00 |
| | | | | 345/419 |
| 2016/0171762 | A1* | 6/2016 | Chang | G06V 10/771 |
| | | | | 345/423 |
| 2016/0364917 | A1* | 12/2016 | Zhang | G06T 17/00 |
| 2017/0069099 | A1* | 3/2017 | Chen | G06T 7/30 |
| 2018/0122137 | A1* | 5/2018 | Tian | G06T 17/00 |
| 2018/0165871 | A1* | 6/2018 | Mrowca | G06T 19/20 |
| 2018/0330504 | A1 | 11/2018 | Karlinsky et al. | |
| 2020/0020118 | A1* | 1/2020 | Chapdelaine-Couture | |
| | | | | G06T 7/74 |
| 2020/0211293 | A1* | 7/2020 | Kim | B64G 1/244 |
| 2023/0222749 | A1* | 7/2023 | Luo | G06T 7/75 |
| | | | | 345/419 |

FOREIGN PATENT DOCUMENTS

| | | |
|---|---|---|
| CN | 104484882 A | 4/2015 |
| CN | 105184789 A | 12/2015 |
| CN | 105844696 A | 8/2016 |
| CN | 106940186 A | 7/2017 |
| CN | 109087342 A | 12/2018 |
| CN | 110163903 A | 8/2019 |
| CN | 111275810 A | 6/2020 |
| CN | 111862351 A | 10/2020 |

OTHER PUBLICATIONS

Search Report mailed Oct. 20, 2021 for PCT Application No. PCT/CN2021/107975, English Translation (5 pages).
Written Opinion for International Application No. PCT/CN2021/107975, mailed Oct. 20, 2021, 9 Pages.

* cited by examiner

POSITIONING MODEL OPTIMIZATION METHOD, POSITIONING METHOD, POSITIONING DEVICE, AND STORAGE MEDIUM

CROSS-REFERENCE TO RELATED APPLICATION

The present disclosure is the U.S. national phase of International Application No. PCT/CN2021/107975, filed Jul. 22, 2021, and claims priority to Chinese Patent Application No. 202010767042.3, titled "POSITIONING MODEL OPTIMIZATION METHOD, POSITIONING METHOD, POSITIONING DEVICE, AND STORAGE MEDIUM", filed with China National Intellectual Property Administration on Aug. 3, 2020, which is incorporated herein by reference in its entirety.

TECHNICAL FIELD

The present disclosure relates to the field of positioning, and more particularly, to a positioning model optimization method, an image-based positioning method and positioning device, and a computer-readable storage medium.

BACKGROUND

Conventional positioning technologies are typically based on Global Positioning System (GPS) or Wi-Fi wireless networks, etc. However, these positioning technologies have many problems such as susceptibility to interference and limited scope of application. Compared with the commonly used positioning methods such as GPS, image-based positioning methods can provide better positioning accuracy by performing three-dimensional (3D) positioning relative to known scenes, so as to better serve Augmented Reality (AR) applications.

Generally, in an image-based positioning method, a 3D positioning model obtained by 3D reconstruction of a series of images of a scene contains a large number of 3D points as well as corresponding two-dimensional (2D) feature points in each image and their descriptors. For an image to be queried that needs to be positioned, it is first required to extract 2D feature points and their descriptors from the image to be queried, and then match them with descriptors in a positioning model to determine the matching descriptors and accordingly the corresponding 3D points, so as to achieve the positioning of the image to be queried. Therefore, the number of 3D points and corresponding descriptors in the positioning model is positively correlated with the size of the scene and the number of input images, and directly affects the efficiency of the positioning algorithm. Conventional image-based positioning methods rely on high computing power to process a large number of 3D points and descriptors, and are thus typically only implemented on servers. However, the positioning methods on servers rely on network connections and bandwidths with high speeds, which imposes considerable limitations on various real-time AR applications on mobile terminals.

SUMMARY

In order to overcome the defects in the related art, the present disclosure provides a positioning model optimization method, an image-based positioning method and positioning device, as well as a computer-readable storage medium.

According to an aspect of the present disclosure, a positioning model optimization method is provided. The method includes: inputting a positioning model for a scene, the positioning model including a three-dimensional (3D) point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and outputting the optimized positioning model for the scene.

According to another aspect of the present disclosure, an image-based positioning method is provided. The method includes: inputting an image to be queried; positioning the image to be queried using an optimized positioning model for a scene to which the image to be queried belongs; and outputting a pose of a camera capturing the image to be queried. The optimized positioning model for the scene is obtained by: inputting a positioning model for the scene, the positioning model including a three-dimensional (3D) point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and outputting the optimized positioning model for the scene.

According to another aspect of the present disclosure, an image-based positioning device is provided. The device includes: an input unit configured to input an image to be queried; a positioning unit configured to position the image to be queried using an optimized positioning model for a scene to which the image to be queried belongs; and an output unit configured to output a pose of a camera capturing the image to be queried. The positioning device further includes an optimization unit configured to: receive an inputted positioning model for the scene, the positioning model including a three-dimensional (3D) point cloud and a plurality of descriptors corresponding to each 3D point in the 3D point cloud; determine, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and output the optimized positioning model for the scene.

According to another aspect of the present disclosure, an image-based positioning device is provided. The image-based positioning device includes one or more processors; and one or more memories having computer-readable codes stored therein. The computer-readable codes, when executed by the one or more processors, cause the one or more processors to perform the method according to any of the above aspects.

According to another aspect of the present disclosure, a computer-readable storage medium is provided. The computer-readable storage medium has computer-readable instructions stored thereon. The computer-readable instructions, when executed by a processor, cause the processor to perform the method according to any of the above aspects.

BRIEF DESCRIPTION OF DRAWINGS

The above and other objects, features and advantages of the present disclosure will become more apparent from the more detailed description of the embodiments of the present disclosure in conjunction with the accompanying drawings. The accompanying drawings are used to provide further understanding of the embodiments of the present disclosure, constitute a part of the specification, and are used to explain the present disclosure together with the embodiments of the present disclosure, but do not constitute a limitation to the present disclosure. In the drawings, the same reference numbers generally refer to the same components or steps.

DESCRIPTION

In order to make the objects, technical solutions and advantages of the present disclosure more apparent, exemplary embodiments according to the present disclosure will be described in detail below with reference to the accompanying drawings. Obviously, the described embodiments are only some embodiments of the present disclosure and not all of the embodiments according to the present disclosure. It should be understood that the present disclosure is not limited by the exemplary embodiments described herein.

Embodiments of the present disclosure will be described in further detail below with reference to the accompanying figures. While some embodiments of the present disclosure are shown in the figures, it should be understood that the present disclosure may be embodied in various forms and should not be construed as limited to the embodiments set forth herein. Rather, these embodiments are provided for the purpose of more thorough and complete understanding of the present disclosure. It should be understood that the figures and embodiments of the present disclosure are only for the purpose of illustration, and are not intended to limit the scope of the present disclosure.

It should be understood that various steps described in the method embodiments of the present disclosure may be performed in different orders and/or in parallel. Furthermore, method embodiments may include one or more additional steps and/or may omit one or more illustrated steps. The scope of the present disclosure is not limited in this regard.

As used herein, the term "including" and variations thereof are open-ended inclusions, i.e., "including but not limited to". The term "based on" means "based at least in part on." The term "an embodiment" means "at least one embodiment". The term "another embodiment" means "at least one further embodiment". The term "some embodiments" means "at least some embodiments". Relevant definitions of other terms will be given in the description below.

It should be noted that concepts such as "first" and "second" as used in the present disclosure are only used to distinguish different devices, modules or units from each other, and are not intended to limit any order or interdependence between the functions performed by these devices, modules or units.

It should be noted that the modifications by "one" and "a plurality" as used in the present disclosure are illustrative rather than limiting, and it can be appreciated by those skilled in the an that they should be understood as "one or more", unless explicitly indicated otherwise in the context.

Figure 1:
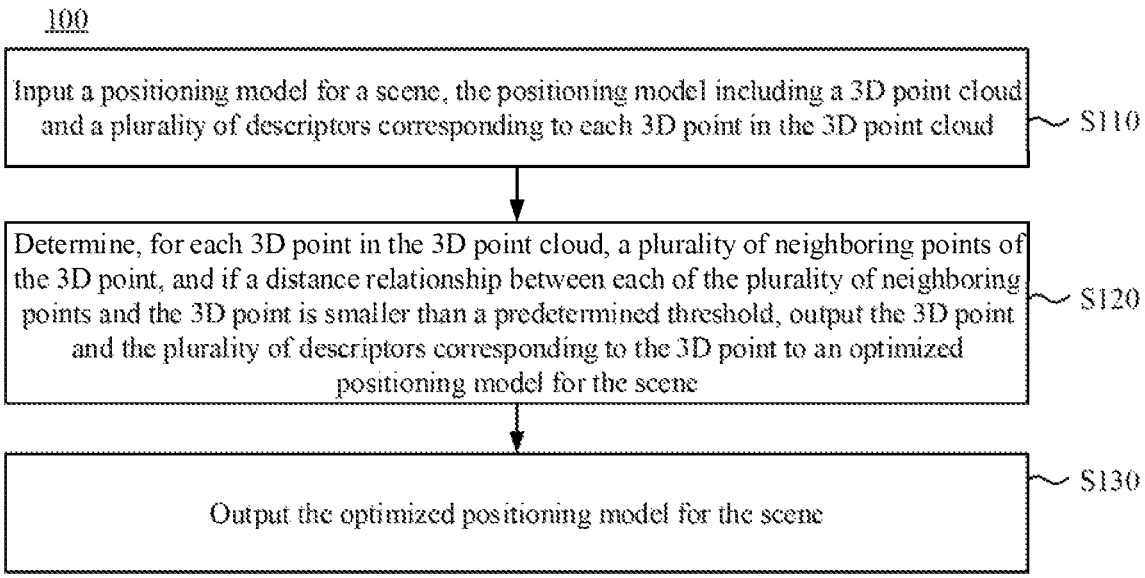
FIG. 1 shows a flowchart illustrating a positioning model optimization method 100 according to an embodiment of the present disclosure.

In the following, a positioning model optimization method according to an embodiment of the present disclosure will be described with reference to FIG. 1. FIG. 1 shows a flowchart illustrating a positioning model optimization method 100 according to an embodiment of the present disclosure.

As shown in FIG. 1, as Step S110, a positioning model for a scene is inputted. The positioning model includes a 3D point cloud and a plurality of descriptors corresponding to each 3D point in the 3D point cloud. The scene can be for example any geographic scene such as a building, a city, etc. According to an example of an embodiment of the present disclosure, for a certain scene, its positioning model may be a 3D positioning model obtained by performing 3D reconstruction of the scene. For example, a series of images of the scene can be captured in advance, and then a 3D positioning model for the scene can be obtained by performing image-based 3D reconstruction of the scene. The 3D positioning model includes a 3D point cloud formed by a large number of 3D points, and each 3D point in the 3D point cloud corresponds to a series of 2D feature points located on the respective images and descriptors of the 2D feature points. Here, a descriptor may be, for example, a parameter describing the relationship between the 2D feature point and its surrounding contents, such that matching of the feature points can be achieved by using the descriptor. For example, the descriptor can be a binary feature descriptor that describes small pixel blocks around the feature point. Commonly used descriptors include Binary Robust Invariant Scalable Keypoints (BRISK) descriptor, Binary Robust Independent Elementary Features (BRIEF) descriptor, etc.

Next, at Step S120, for each 3D point in the 3D point cloud, a plurality of neighboring points of the 3D point are determined, and if a distance relationship between each of the plurality of neighboring points and the 3D point is smaller than a predetermined threshold, the 3D point and the plurality of descriptors corresponding to the 3D point are outputted to an optimized positioning model for the scene. Otherwise, if the distance relationship between any of the plurality of neighboring points and the 3D point is not smaller than the predetermined threshold, the 3D point and its corresponding descriptors are not outputted. With the above process, the 3D points in the 3D point cloud are clustered to reduce the number of redundant 3D points and their corresponding descriptors, by an extent depending on the predetermined threshold.

According to an example of the embodiment of the present disclosure, the operation of determining the plurality of neighboring points of the 3D point may include: determining a plurality of points in the 3D point cloud, each having a distance to the 3D point that is smaller than a first predetermined threshold, as the plurality of neighboring points. For example, for a certain 3D point p, if the distance between a certain point p' in its vicinity and the 3D point p is smaller than the first predetermined threshold, the point p' is determined to be a neighboring point of the 3D point p.

Similarly, n neighboring points of the 3D point p can be determined. The range of clustering is dependent on the value of the first predetermined threshold. For example, if the first predetermined threshold is 5, it means that points having a distance to the 3D point p that is smaller than 5 are neighboring points of the 3D point p. Then it is determined based on the distance relationship between these neighboring points and the 3D point p whether to output the 3D point p and its corresponding descriptors. It can be appreciated that the first predetermined threshold is not limited to the example value here. Rather, any suitable value may be selected according to actual requirements.

According to an example of the embodiment of the present disclosure, the distance relationship between each of the plurality of neighboring points and the 3D point being smaller than the predetermined threshold may refer to: a distance between each of the plurality of neighboring points and the 3D point being smaller than a second predetermined threshold. For example, for the plurality of neighboring points of a 3D point p, the distance between each neighboring point p' of the plurality of neighboring points and the 3D point p is calculated. If the distance between each neighboring point p' and the 3D point p is smaller than the second predetermined threshold, the 3D point p and the plurality of descriptors corresponding to the 3D point p are outputted to the optimized positioning model for the scene. Otherwise, the 3D point p and its corresponding descriptors are not outputted. For example, the distance between each neighboring point p' and the 3D point p may be the distance between the 3D coordinates (x', y', z') of p' and the 3D coordinates (x, y, z) of p.

Alternatively, according to another example of the embodiment of the present disclosure, the distance relationship between each of the plurality of neighboring points and the 3D point being smaller than the predetermined threshold may refer to: a distance between a plurality of descriptors of each of the plurality of neighboring points and a plurality of descriptors of the 3D point being smaller than a third predetermined threshold. As described above, each 3D point corresponds to a series of 2D feature points in the images, and each 2D feature point has a corresponding descriptor. That is, each 3D point corresponds to a plurality of descriptors, and each of a plurality of neighboring points of each 3D point also corresponds to a plurality of descriptors. For example, a 3D point p may have m corresponding descriptors $d_1, \ldots, d_m$, and a neighboring point p' of the 3D point p may have m' corresponding descriptors $d'_1, \ldots, d'_{m'}$, where m and m' depend on the number of 2D feature points used for reconstruction of the 3D points p and p'. According to an example of an embodiment of the present disclosure, in order to determine whether the distance between the plurality of descriptors of each of the neighboring points and the descriptors of the 3D point is smaller than the third predetermined threshold, the average values of the descriptors of the respective points can be compared. For example, if the distance between the average value of the m' descriptors $d'_1, \ldots, d'_{m'}$ of each neighboring point p' and the average value of the m descriptors $d_1, \ldots d_m$ of the 3D point p is smaller than the third predetermined threshold, the 3D point p and its corresponding descriptors $d_1, \ldots, d_m$ are outputted to the optimized positioning model for the scene. Otherwise, the 3D point p and its corresponding descriptors are not outputted. Here, if a descriptor is a multi-dimensional binary vector, for example, a 128-dimensional vector, the distance between the average value of the descriptors of the 3D point p and the average value of the descriptors of its neighboring point p' can be, for example, their Euclidean distance.

It can be appreciated that, although the distance between descriptors of a 3D point and descriptors of its neighboring point is described above by taking the distance between the average value of the descriptors of the 3D point and the average value of the descriptors of its neighboring point as an example, the present disclosure is not limited to this. For example, the distance between descriptors of a 3D point and descriptors of its neighboring point can be represented by the distance between a weighted value of the descriptors of the 3D point and a weighted value of the descriptors of its neighboring point. Alternatively, a certain number of descriptors can be selected for each of the 3D point and its neighboring point, and based on the distance between these descriptors, an average value, weighted value, or maximum/minimum value can be determined for comparison with the third predetermined threshold.

According to an example of the embodiment of the present disclosure, the distance relationship between each of the plurality of neighboring points and the 3D point being smaller than the predetermined threshold may refer to: a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold. That is, when the distance relationship between each of the plurality of neighboring points and the 3D point satisfies both of the above two threshold conditions, the 3D point and its corresponding descriptors are outputted to the optimized positioning model for the scene. Otherwise, the 3D point and its corresponding descriptors are not outputted.

It is to be noted that, the second predetermined threshold and the third predetermined threshold in the above example may be selected according to actual requirements, and the present disclosure is not limited to this. In addition, according to an example of the embodiment of the present disclosure, the second predetermined threshold may be smaller than the first predetermined threshold. That is, a large range of clustering for the plurality of neighboring points of the 3D point can be determined first based on a large first predetermined threshold, and then it can be further determined whether to output the 3D point and its corresponding descriptors based on the second predetermined threshold and/or the third predetermined threshold. Alternatively, according to another example of the embodiment of the present disclosure, the first predetermined threshold may be equal to the second predetermined threshold. That is, the operation of determining the plurality of neighboring points of the 3D point and the operation of determining whether the distance between each of the plurality of neighboring points and the 3D point is smaller than the second predetermined threshold may be performed simultaneously.

After the inputted positioning model for the scene is optimized, next, at Step S130, the optimized positioning model for the scene is outputted. The outputted optimized positioning model for the scene can enable quick and efficient positioning calculation, so in addition to the conventional positioning calculation on servers, it can also be applied to positioning calculation on mobile terminals such as mobile phones and portable computers.

With the positioning model optimization method according to the present disclosure, a plurality of neighboring points of each 3D point in the 3D point cloud are determined, and when a distance relationship between each of the plurality of neighboring points and the 3D point is smaller than a predetermined threshold, the 3D point and its corresponding descriptors are outputted to the optimized positioning model for the scene, which can effectively reduce the number of redundant 3D points in the positioning model, increase the positioning speed, and improve the positioning efficiency. In this way, the positioning calculation on mobile devices can be optimized, making various real-time AR applications with 3D positioning based on scene possible on mobile devices.

Figure 2:
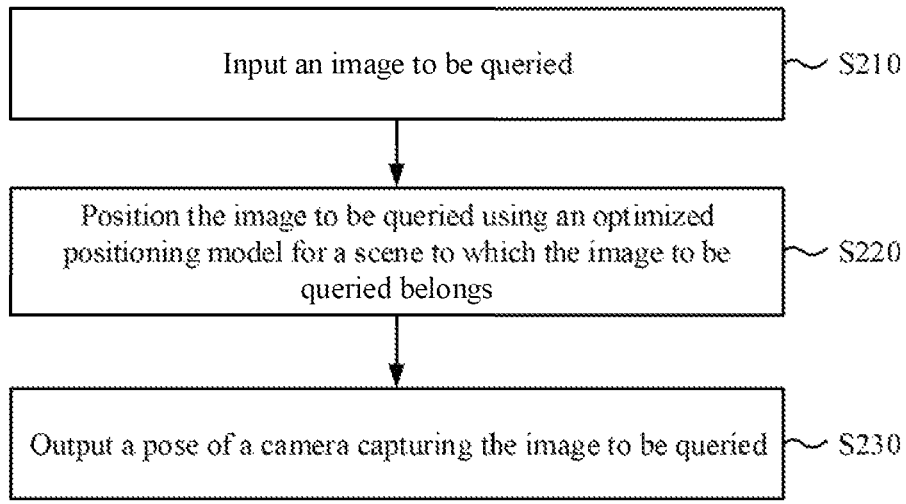
FIG. 2 shows a flowchart illustrating an image-based positioning method 200 according to an embodiment of the present disclosure.

An image-based positioning method according to an embodiment of the present disclosure will be described below with reference to FIG. 2. FIG. 2 shows a flowchart illustrating an image-based positioning method 200 according to an embodiment of the present disclosure. As shown in FIG. 2, at step S210, an image to be queried is inputted. The image to be queried is, for example, an image captured by a photographing device such as a camera. Next, at Step S220, the image to be queried is positioned using an optimized positioning model for a scene to which the image to be queried belongs. The optimized positioning model for the scene can be obtained, for example, by: inputting a positioning model for the scene, the positioning model including a 3D point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and outputting the optimized positioning model for the scene.

According to an example of an embodiment of the present disclosure, for a certain scene, its positioning model may be a 3D positioning model obtained by performing 3D reconstruction of the scene. For example, a series of images of the scene can be captured in advance, and then a 3D positioning model for the scene can be obtained by performing image-based 3D reconstruction of the scene. The 3D positioning model includes a 3D point cloud formed by a large number of 3D points, and each 3D point in the 3D point cloud corresponds to a series of 2D feature points located on the respective images and descriptors of the 2D feature points. Here, a descriptor may be, for example, a parameter describing the relationship between the 2D feature point and its surrounding contents, such that matching of the feature points can be achieved by using the descriptor. For example, the descriptor can be a binary feature descriptor that describes small pixel blocks around the feature point. Commonly used descriptors include BRISK descriptor, BRIEF descriptor, etc.

According to an example of the embodiment of the present disclosure, the operation of determining the plurality of neighboring points of the 3D point may include: determining a plurality of points in the 3D point cloud, each having a distance to the 3D point that is smaller than a first predetermined threshold, as the plurality of neighboring points. For example, for a certain 3D point p, if the distance between a certain point p' in its vicinity and the 3D point p is smaller than the first predetermined threshold, the point p' is determined to be a neighboring point of the 3D point p. Similarly, n neighboring points of the 3D point p can be determined. The range of clustering is dependent on the value of the first predetermined threshold. For example, if the first predetermined threshold is 5, it means that points having a distance to the 3D point p that is smaller than 5 are neighboring points of the 3D point p. Then it is determined based on the distance relationship between these neighboring points and the 3D point p whether to output the 3D point p and its corresponding descriptors. It can be appreciated that the first predetermined threshold is not limited to the example value here. Rather, any suitable value may be selected according to actual requirements.

According to an example of the embodiment of the present disclosure, the distance relationship between each of the plurality of neighboring points and the 3D point being smaller than the predetermined threshold may refer to: a distance between each of the plurality of neighboring points and the 3D point being smaller than a second predetermined threshold. For example, for the plurality of neighboring points of a 3D point p, the distance between each neighboring point p' of the plurality of neighboring points and the 3D point p is calculated. If the distance between each neighboring point p' and the 3D point p is smaller than the second predetermined threshold, the 3D point p and the plurality of descriptors corresponding to the 3D point p are outputted to the optimized positioning model for the scene. Otherwise, the 3D point p and its corresponding descriptors are not outputted. For example, the distance between each neighboring point p' and the 3D point p may be the distance between the 3D coordinates (x', y', z') of p' and the 3D coordinates (x, y, z) of p.

Alternatively, according to another example of the embodiment of the present disclosure, the distance relationship between each of the plurality of neighboring points and the 3D point being smaller than the predetermined threshold may refer to: a distance between a plurality of descriptors of each of the plurality of neighboring points and a plurality of descriptors of the 3D point being smaller than a third predetermined threshold. As described above, each 3D point corresponds to a series of 2D feature points in the images, and each 2D feature point has a corresponding descriptor. That is, each 3D point corresponds to a plurality of descriptors, and each of a plurality of neighboring points of each 3D point also corresponds to a plurality of descriptors. For example, a 3D point p may have m corresponding descriptors $d_1, \ldots, d_m$, and a neighboring point p' of the 3D point p may have m' corresponding descriptors $d'_1, \ldots, d'_{m'}$, where m and m' depend on the number of 2D feature points used for reconstruction of the 3D points p and p'. According to an example of an embodiment of the present disclosure, in order to determine whether the distance between the plurality of descriptors of each of the neighboring points and the descriptors of the 3D point is smaller than the third predetermined threshold, the average values of the descriptors of the respective points can be compared. For example, if the distance between the average value of the m' descriptors $d'_1, \ldots, d'_{m'}$ of each neighboring point p' and the average value of the m descriptors $d_1, \ldots, d_m$ of the 3D point p is smaller than the third predetermined threshold, the 3D point p and its corresponding descriptors $d_1, \ldots, d_m$ are outputted to the optimized positioning model for the scene. Otherwise, the 3D point p and its corresponding descriptors are not outputted. Here, if a descriptor is a multi-dimensional binary vector, for example, a 128-dimensional vector, the distance between the average value of the descriptors of the 3D point p and the average value of the descriptors of its neighboring point p' can be, for example, their Euclidean distance.

It can be appreciated that, although the distance between descriptors of a 3D point and descriptors of its neighboring point is described above by taking the distance between the average value of the descriptors of the 3D point and the average value of the descriptors of its neighboring point as an example, the present disclosure is not limited to this. For example, the distance between descriptors of a 3D point and descriptors of its neighboring point can be represented by the distance between a weighted value of the descriptors of the 3D point and a weighted value of the descriptors of its neighboring point. Alternatively, a certain number of descriptors can be selected for each of the 3D point and its neighboring point, and based on the distance between these descriptors, an average value, weighted value, or maximum/minimum value can be determined for comparison with the third predetermined threshold.

According to an example of the embodiment of the present disclosure, the distance relationship between each of the plurality of neighboring points and the 3D point being smaller than the predetermined threshold may refer to: a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold. That is, when the distance relationship between each of the plurality of neighboring points and the 3D point satisfies both of the above two threshold conditions, the 3D point and its corresponding descriptors are outputted to the optimized positioning model for the scene. Otherwise, the 3D point and its corresponding descriptors are not outputted.

It is to be noted that, the second predetermined threshold and the third predetermined threshold in the above example may be selected according to actual requirements, and the present disclosure is not limited to this. In addition, according to an example of the embodiment of the present disclosure, the second predetermined threshold may be smaller than the first predetermined threshold. That is, a large range of clustering for the plurality of neighboring points of the 3D point can be determined first based on a large first predetermined threshold, and then it can be further determined whether to output the 3D point and its corresponding descriptors based on the second predetermined threshold and/or the third predetermined threshold. Alternatively, according to another example of the embodiment of the present disclosure, the first predetermined threshold may be equal to the second predetermined threshold. That is, the operation of determining the plurality of neighboring points of the 3D point and the operation of determining whether the distance between each of the plurality of neighboring points and the 3D point is smaller than the second predetermined threshold may be performed simultaneously.

After positioning the image to be queried using the optimized positioning model for the scene, next, at Step S230, a pose of a camera capturing the image to be queried is outputted. The pose of the camera includes, for example, a position and a posture of the camera when the image to be queried is captured. For example, the outputted pose of the camera may be a variable having 6 degrees of freedom that describes 3D coordinates and a rotation direction of the camera.

With the positioning method according to the above embodiment of the present disclosure, a plurality of neighboring points of each 3D point in the 3D point cloud are determined, and when a distance relationship between each of the plurality of neighboring points and the 3D point is smaller than a predetermined threshold, the 3D point and its corresponding descriptors are outputted to optimize the positioning model for the scene. Then the optimized positioning model for the scene can be used to position the image to be queried, which can effectively reduce the number of redundant 3D points in the positioning model, increase the positioning speed, and improve the positioning efficiency. In this way, the positioning calculation on mobile devices can be optimized, making various real-time AR applications with 3D positioning based on scene possible on mobile devices.

Figure 3:
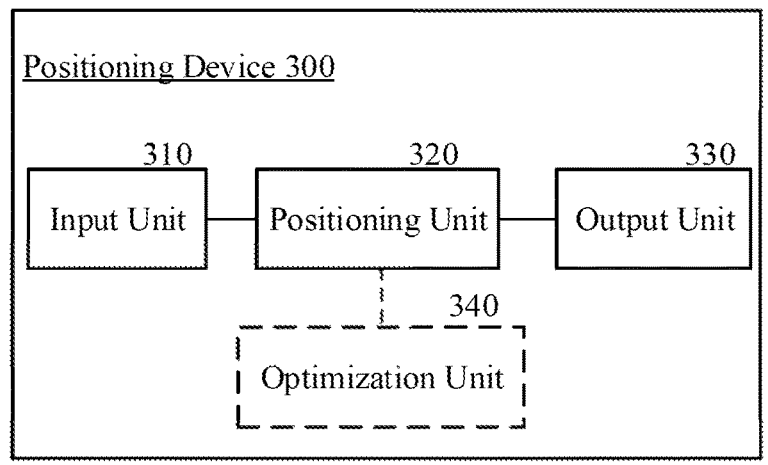
FIG. 3 shows a schematic diagram illustrating a structure of an image-based positioning device 300 according to an embodiment of the present disclosure.

An image-based positioning device according to an embodiment of the present disclosure will be described below with reference to FIG. 3. FIG. 3 shows a schematic diagram illustrating a structure of an image-based positioning device 300 according to an embodiment of the present disclosure. Since the functions of the positioning device 300 are the same as the details of the positioning method 200 described above with reference to FIG. 2, the detailed description of the same content will be omitted here for simplicity. As shown in FIG. 3, the positioning device 300 includes: an input unit 310 configured to input an image to be queried; a positioning unit 320 configured to position the image to be queried using an optimized positioning model for a scene to which the image to be queried belongs; and an output unit 330 configured to output a pose of a camera capturing the image to be queried. In addition, the positioning device 300 may further include an optimization unit 340 configured to: receive an inputted positioning model for the scene, the positioning model including a 3D point cloud and a plurality of descriptors corresponding to each 3D point in the 3D point cloud; determine, for each 3D point in the 3D point cloud, a plurality of neighboring points of the 3D point, and if a distance relationship between each of the plurality of neighboring points and the 3D point is smaller than a predetermined threshold, output the 3D point and the plurality of descriptors corresponding to the 3D point to an optimized positioning model for the scene; and output the optimized positioning model for the scene. In addition to these four units, the positioning device 300 may further include other components. However, since these components are not related to the content of the embodiment of the present disclosure, illustration and description thereof will be omitted here.

With the positioning device according to the above embodiment of the present disclosure, a plurality of neighboring points of each 3D point in the 3D point cloud are determined, and when a distance relationship between each of the plurality of neighboring points and the 3D point is smaller than a predetermined threshold, the 3D point and its corresponding descriptors are outputted to optimize the positioning model for the scene. Then the optimized positioning model for the scene can be used to position the image to be queried, which can effectively reduce the number of redundant 3D points in the positioning model, increase the positioning speed, and improve the positioning efficiency. In this way, the positioning calculation on mobile devices can be optimized, making various real-time AR applications with 3D positioning based on scene possible on mobile devices.

Figure 4:
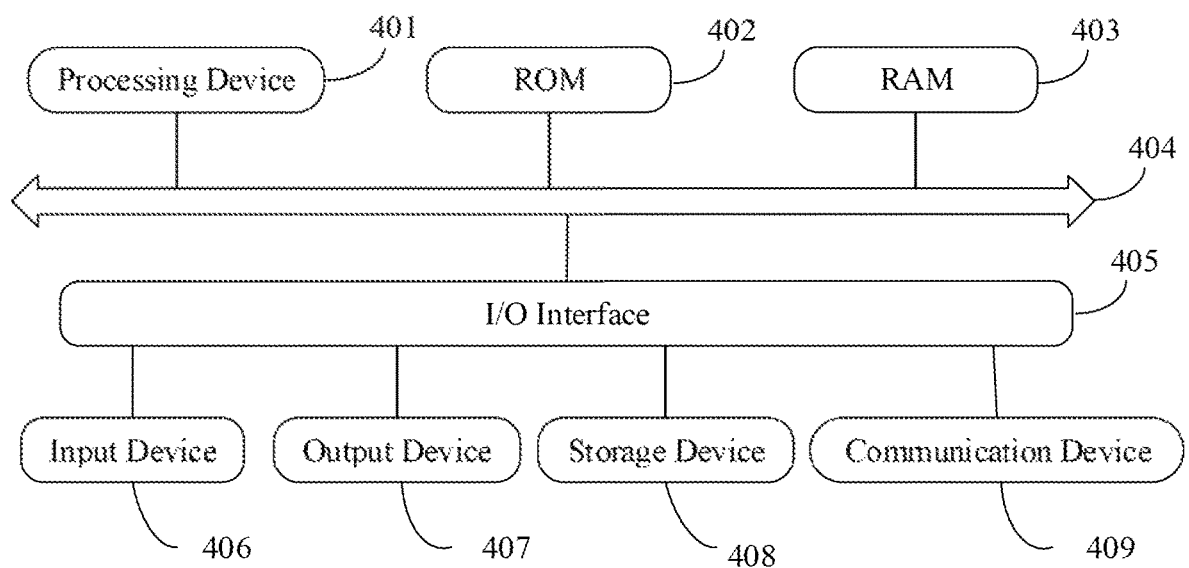
FIG. 4 shows a schematic diagram illustrating a structure of an exemplary electronic device 400 according to an embodiment of the present disclosure.

In addition, the positioning device according to the embodiment of the present disclosure can also be implemented by means of the architecture of the exemplary electronic device shown in FIG. 4. FIG. 4 shows a schematic diagram illustrating a structure of an exemplary electronic device 400 according to an embodiment of the present disclosure. An exemplary electronic device 400 according to an embodiment of the present disclosure includes at least one or more processors, and one or more memories. The memory stores computer-readable codes which, when executed by the one or more processors, cause the one or more processors to perform any of the methods described above.

In particular, the electronic device 400 according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. It can be appreciated that the electronic device illustrated in FIG. 4 is exemplary only, and should not be construed as limiting the function and scope of use of the embodiments of the present disclosure.

As illustrated in FIG. 4, the electronic device 400 may include a processing device (such as a central processing unit, a graphics processing unit, etc.) 401, which may perform various appropriate actions and processes in accordance with programs stored in a Read Only Memory (ROM) 402 or loaded from a storage device 408 into a Random Access Memory (RAM) 403. In the RAM 403, various programs and data required for operation of the electronic device 400 may also be stored. The processing device 401, the ROM 402, and the RAM 403 are connected to each other through a bus 404. An Input/Output (I/O) interface 405 is also connected to the bus 404.

Generally, the following devices may be connected to the I/O interface 405: an input device 406 including, for example, a touch screen, a touch pad, a keyboard, a mouse, a camera, a microphone, an accelerometer, a gyroscope, etc.; an output device 407 including, for example, a Liquid Crystal Display (LCD), a speaker, an oscillator, etc.; the storage device 408 including, for example, a magnetic tape or a hard disk; and a communication device 409. The communication device 409 may allow the electronic device 400 to perform wireless or wired communication with other devices for data exchange. Although FIG. 4 illustrates the electronic device 400 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transitory computer-readable storage medium. The computer program includes program codes for implementing the method illustrated in any of the flowcharts. In these embodiments, the computer program may be downloaded and installed from a network through the communication device 409, or installed from the storage device 408, or installed from the ROM 402. When the computer program is executed by the processing device 401, the above-mentioned functions defined in the methods according to the embodiments of the present disclosure are performed.

Figure 5:
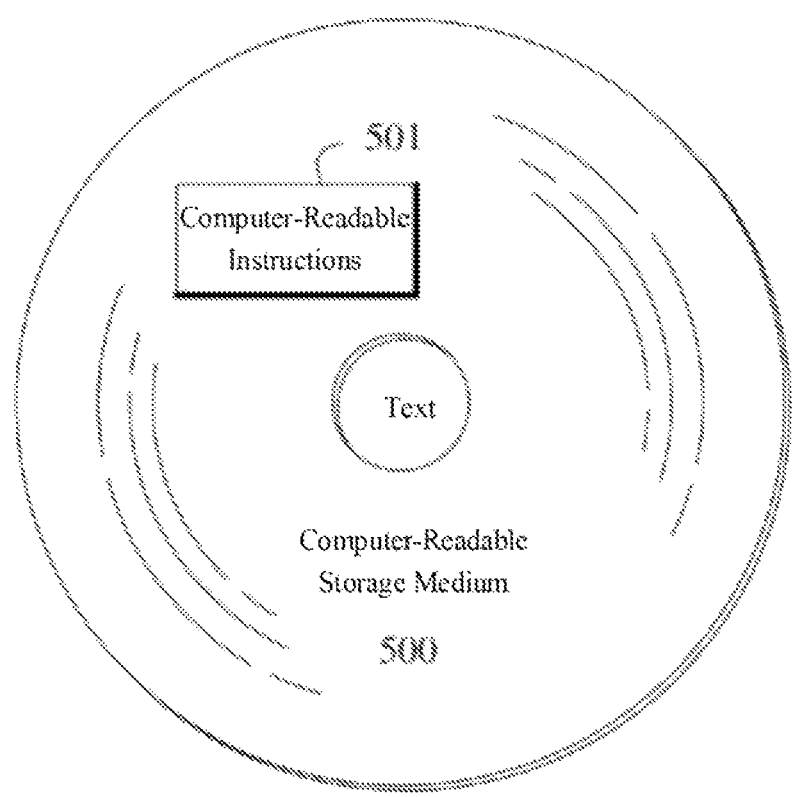
FIG. 5 shows a schematic diagram illustrating an exemplary computer-readable storage medium 500 according to an embodiment of the present disclosure.

In addition, the present disclosure further provides a computer readable storage medium. FIG. 5 is a schematic diagram showing an exemplary computer readable storage medium 500 according to an embodiment of the present disclosure. As shown in FIG. 5, the computer readable storage medium 500 stores computer readable instructions 501 which, when executed by a processor, cause the processor to perform the positioning model optimization method and the positioning method described in the above embodiments.

It is to be noted that the above non-transitory computer-readable storage medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM or a flash memory), an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable storage medium other than the computer-readable storage medium, which may transmit, propagate, or transfer programs used by or used with an instruction execution system, apparatus or device. The program codes stored on the computer-readable storage medium may be transmitted via any appropriate medium, including but not limited to electric cable, optical cable, Radio Frequency (RF), or any suitable combination thereof.

The above computer-readable storage medium may be included in the above electronic device; or may be standalone without being assembled into the electronic device.

The computer program codes for implementing the operations according to the embodiments of the present disclosure may be written in one or more programming languages or any combination thereof. The programming languages may include, but not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate the architecture, functionality, and operation of possible implementations of the systems, methods and computer program products according to various embodiments of the present disclosure. In this regard, each block in the flowchart or block diagram may represent a module, a program segment, or a portion of codes that contains one or more executable instructions for implementing the specified logical functions. It should also be noted that, in some alternative implementations, the functions shown in the blocks may occur in other orders than those shown in the figures. For example, two blocks shown in succession may, in fact, be executed substantially concurrently, or the blocks may sometimes be executed in the reverse order, depending on the functionality involved. It is also to be noted that each block in the block diagrams and/or flowcharts, and combinations of blocks in the block diagrams and/or flowcharts, can be implemented in dedicated hardware-based systems that perform the specified functions or operations, or can be implemented in a combination of dedicated hardware and computer instructions.

The units involved in the embodiments of the present disclosure may be implemented in software or hardware. Here, the names of the units do not constitute any limitation of the units themselves under certain circumstances.

The functions described above may be performed, at least in part, by one or more hardware logic components. For example, as non-limiting examples, exemplary types of hardware logic components that may be used include: Field Programmable Gate Arrays (FPGAs), Application Specific Integrated Circuits (ASICs). Application Specific Standard Products (ASSPs), Systems on Chips (SOCs), Complex Programmable Logical Devices (CPLDs) and the like.

In the context of the present disclosure, a computer-readable storage medium may be a tangible medium that may contain or store a program for use by or in connection with an instruction execution system, apparatus or device. The machine-readable medium may be a machine-readable signal medium or a machine-readable storage medium. The machine-readable medium may include, but not limited to, electronic, magnetic, optical, electromagnetic, infrared, or semiconductor system, apparatus, or device, or any suitable combination thereof. More specific examples of machine-readable storage medium may include one or more wire-based electrical connection, portable computer disk, hard disk, Random Access Memory (RAM), Read Only Memory (ROM), Erasable Programmable Read Only Memory (EPROM or flash memory), optical fiber, Compact Disk Read Only Memory (CD-ROM), optical storage device, magnetic storage device, or any suitable combination thereof.

Some features that are preferably implemented in some embodiments are now disclosed in a solution-based form.

A1. A positioning model optimization method, comprising: inputting a positioning model for a scene, the positioning model comprising a three-dimensional (3D) point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and outputting the optimized positioning model for the scene.

A2. The positioning model optimization method according to Solution A1, wherein said determining the plurality of neighboring points of the 3D point comprises: determining a plurality of points in the 3D point cloud, each having a distance to the 3D point that is smaller than a first predetermined threshold, as the plurality of neighboring points.

A3. The positioning model optimization method according to Solution A1, wherein the distance relationship between each of the plurality of neighboring points and the 3D point being smaller than the predetermined threshold comprises: a distance between each of the plurality of neighboring points and the 3D point being smaller than a second predetermined threshold, or a distance between a plurality of descriptors of each of the plurality of neighboring points and a plurality of descriptors of the 3D point being smaller than a third predetermined threshold.

A4. The positioning model optimization method according to Solution A1, wherein the distance relationship between each of the plurality of neighboring points and the 3D point being smaller than the predetermined threshold comprises: a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold.

A5. The positioning model optimization method according to Solution A3 or A4, wherein the distance between the plurality of descriptors of each of the plurality of neighboring points and the plurality of descriptors of the 3D point being smaller than the third predetermined threshold comprises: a distance between an average value of the plurality of descriptors of each of the plurality of neighboring points and an average value of the plurality of descriptors of the 3D point being smaller than the third predetermined threshold.

A6. The positioning model optimization method according to Solution A1, wherein the positioning model for the scene is a 3D positioning model obtained by performing 3D reconstruction of the scene.

Some features that are preferably implemented in some embodiments are now disclosed in a solution-based form.

B1. An image-based positioning method, comprising: inputting an image to be queried; positioning the image to be queried using an optimized positioning model for a scene to which the image to be queried belongs; and outputting a pose of a camera capturing the image to be queried, wherein the optimized positioning model for the scene is obtained by: inputting a positioning model for the scene, the positioning model comprising a three-dimensional (3D) point cloud and a plurality of descriptors corresponding to each 3D point in the 3D point cloud; determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and outputting the optimized positioning model for the scene.

B2. The positioning method according to Solution B1, wherein said determining the plurality of neighboring points of the 3D point comprises: determining a plurality of points in the 3D point cloud, each having a distance to the 3D point that is smaller than a first predetermined threshold, as the plurality of neighboring points.

B3. The positioning method according to Solution B1, wherein the distance relationship between each of the plurality of neighboring points and the 3D point being smaller than the predetermined threshold comprises: a distance between each of the plurality of neighboring points and the 3D point being smaller than a second predetermined threshold, or a distance between a plurality of descriptors of each of the plurality of neighboring points and a plurality of descriptors of the 3D point being smaller than a third predetermined threshold.

B4. The positioning method according to Solution B1, wherein the distance relationship between each of the plurality of neighboring points and the 3D point being smaller than the predetermined threshold comprises: a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold.

B5. The positioning method according to Solution B3 or B4, wherein the distance between the plurality of descriptors of each of the plurality of neighboring points and the plurality of descriptors of the 3D point being smaller than the third predetermined threshold comprises: a distance between an average value of the plurality of descriptors of each of the plurality of neighboring points and an average value of the plurality of descriptors of the 3D point being smaller than the third predetermined threshold.

B6. The positioning method according to Solution B1, wherein the positioning model for the scene is a 3D positioning model obtained by performing 3D reconstruction of the scene.

Some features that are preferably implemented in some embodiments are now disclosed in a solution-based form.

C1. An image-based positioning device, comprising: an input unit configured to input an image to be queried; a positioning unit configured to position the image to be queried using an optimized positioning model for a scene to which the image to be queried belongs; and an output unit configured to output a pose of a camera capturing the image to be queried, wherein the positioning device further comprises an optimization unit configured to: receive an inputted positioning model for the scene, the positioning model comprising a three-dimensional (3D) point cloud and a plurality of descriptors corresponding to each 3D point in the 3D point cloud, determine, for each 3D point in the 3D point cloud, a plurality of neighboring points of the 3D point, and if a distance relationship between each of the plurality of neighboring points and the 3D point is smaller than a predetermined threshold, output the 3D point and the plurality of descriptors corresponding to the 3D point to an optimized positioning model for the scene; and output the optimized positioning model for the scene.

Some features that are preferably implemented in some embodiments are now disclosed in a solution-based form.

D1. An image-based positioning device comprising: one or more processors; and one or more memories having computer-readable codes stored therein, the computer-readable codes, when executed by the one or more processors, causing the one or more processors to perform the method according to any of the above Solutions A1 to A6 and B1 to B6.

E1. A computer-readable storage medium having computer-readable instructions stored thereon, the computer-readable instructions, when executed by a processor, causing the processor to perform the method according to the above Solutions A1 to A6 and B1 to B6.

The above description is merely an illustration of some preferred embodiments of the present disclosure and the technical principles as used. Those skilled in the art should understand that the scope of disclosure involved in the present disclosure is not limited to the technical solutions formed by the specific combinations of the above technical features, and should also cover other technical solutions formed by any combination of the above technical features and their equivalent features without departing from the above disclosed concept, e.g., technical solutions formed by replacing the above features with the technical features disclosed in the present disclosure (but not limited to being disclosed in the present disclosure) with similar functions.

Additionally, although operations are depicted in a particular order, this should not be construed as the operations being necessarily performed in the particular order as shown or in a sequential order. Under certain circumstances, multitask and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Alternatively, various features that are described in the context of a single embodiment can also be implemented in multiple embodiments separately or in any suitable sub-combination.

Although the subject matter has been described in language specific to structural features and/or logical actions of method, it is to be understood that the subject matter defined in the appended claims is not necessarily limited to the specific features or actions described above. Rather, the specific features and actions described above are merely exemplary forms of implementing the claims.

What is claimed is:

1. A positioning model optimization method, comprising:
    inputting a positioning model for a scene, the positioning model comprising a three- dimensional (3D) point cloud and a plurality of descriptors corresponding to each 3D point in the 3D point cloud;
    determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and
    outputting the optimized positioning model for the scene,
    wherein the distance relationship between each of the plurality of neighboring points and the 3D point being smaller than the predetermined threshold comprises:
    a distance between a plurality of descriptors of each of the plurality of neighboring points and a plurality of descriptors of the 3D point being smaller than a third predetermined threshold, or
    a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold.

2. The positioning model optimization method according to claim 1, wherein said determining the plurality of neighboring points of the 3D point comprises:
    determining a plurality of points in the 3D point cloud, each having a distance to the 3D point that is smaller than a first predetermined threshold, as the plurality of neighboring points.

3. The positioning model optimization method according to claim 1, wherein the distance between the plurality of descriptors of each of the plurality of neighboring points and the plurality of descriptors of the 3D point being smaller than the third predetermined threshold comprises:
    a distance between an average value of the plurality of descriptors of each of the plurality of neighboring points and an average value of the plurality of descriptors of the 3D point being smaller than the third predetermined threshold.

4. The positioning model optimization method according to claim 1, wherein the positioning model for the scene is a 3D positioning model obtained by performing 3D reconstruction of the scene.

5. A non-transitory computer-readable storage medium, having computer-readable instructions stored thereon, the computer-readable instructions, when executed by a processor, causing the processor to perform the method according to claim 1.

6. An image-based positioning method, comprising:
inputting an image to be queried;
positioning the image to be queried using an optimized positioning model for a scene to which the image to be queried belongs; and
outputting a pose of a camera capturing the image to be queried,
wherein the optimized positioning model for the scene is obtained by:
inputting a positioning model for the scene, the positioning model comprising a three-dimensional (3D) point cloud and a plurality of descriptors corresponding to each 3D point in the 3D point cloud;
determining, for each 3D point in the 3D point cloud, a plurality of neighboring points of the 3D point, and if a distance relationship between each of the plurality of neighboring points and the 3D point is smaller than a predetermined threshold, outputting the 3D point and the plurality of descriptors corresponding to the 3D point to an optimized positioning model for the scene; and
outputting the optimized positioning model for the scene,
wherein the distance relationship between each of the plurality of neighboring points and the 3D point being smaller than the predetermined threshold comprises:
a distance between a plurality of descriptors of each of the plurality of neighboring points and a plurality of descriptors of the 3D point being smaller than a third predetermined threshold, or
a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold.

7. The positioning method according to claim 6, wherein said determining the plurality of neighboring points of the 3D point comprises:
determining a plurality of points in the 3D point cloud, each having a distance to the 3D point that is smaller than a first predetermined threshold, as the plurality of neighboring points.

8. The positioning method according to claim 6, wherein the distance between the plurality of descriptors of each of the plurality of neighboring points and the plurality of descriptors of the 3D point being smaller than the third predetermined threshold comprises:
a distance between an average value of the plurality of descriptors of each of the plurality of neighboring points and an average value of the plurality of descriptors of the 3D point being smaller than the third predetermined threshold.

9. The positioning method according to claim 6, wherein the positioning model for the scene is a 3D positioning model obtained by performing 3D reconstruction of the scene.

10. An image-based positioning device, comprising:
one or more processors; and
one or more memories having computer-readable codes stored therein, the computer-readable codes, when executed by the one or more processors, causing the one or more processors to perform the method according to claim 6.

11. A non-transitory computer-readable storage medium, having computer-readable instructions stored thereon, the computer-readable instructions, when executed by a processor, causing the processor to perform the method according to claim 6.

12. An image-based positioning device, comprising:
one or more processors; and
one or more memories having computer-readable codes stored therein, the computer-readable codes, when executed by the one or more processors, causing the one or more processors to:
input a positioning model for a scene, the positioning model comprising a three-dimensional (3D) point cloud and a plurality of descriptors corresponding to each 3D point in the 3D point cloud;
determine, for each 3D point in the 3D point cloud, a plurality of neighboring points of the 3D point, and if a distance relationship between each of the plurality of neighboring points and the 3D point is smaller than a predetermined threshold, output the 3D point and the plurality of descriptors corresponding to the 3D point to an optimized positioning model for the scene; and
output the optimized positioning model for the scene,
wherein the distance relationship between each of the plurality of neighboring points and the 3D point being smaller than the predetermined threshold comprises:
a distance between a plurality of descriptors of each of the plurality of neighboring points and a plurality of descriptors of the 3D point being smaller than a third predetermined threshold, or
a distance between each of the plurality of neighboring points and the 3D point being smaller than a second predetermined threshold, and a distance between a plurality of descriptors of each of the plurality of neighboring points and a plurality of descriptors of the 3D point being smaller than a third predetermined threshold.

13. The image-based positioning device according to claim 12, wherein said determining the plurality of neighboring points of the 3D point comprises:
determining a plurality of points in the 3D point cloud, each having a distance to the 3D point that is smaller than a first predetermined threshold, as the plurality of neighboring points.

14. The image-based positioning device according to claim 12, wherein the distance between the plurality of descriptors of each of the plurality of neighboring points and the plurality of descriptors of the 3D point being smaller than the third predetermined threshold comprises:
a distance between an average value of the plurality of descriptors of each of the plurality of neighboring points and an average value of the plurality of descriptors of the 3D point being smaller than the third predetermined threshold.

* * * * *